May 26, 1936.  G. H. HOOPER  2,042,431
MOTOR VEHICLE
Filed July 31, 1934
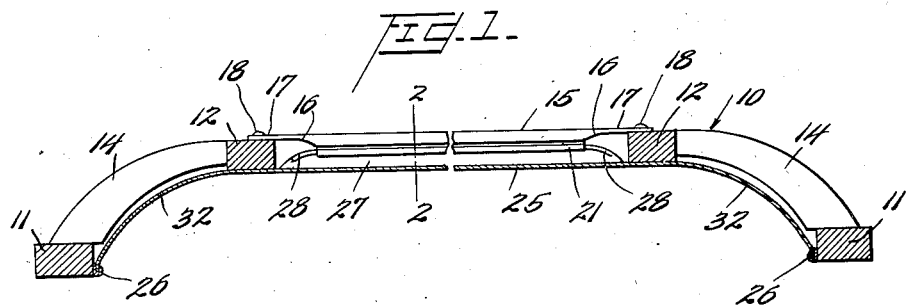
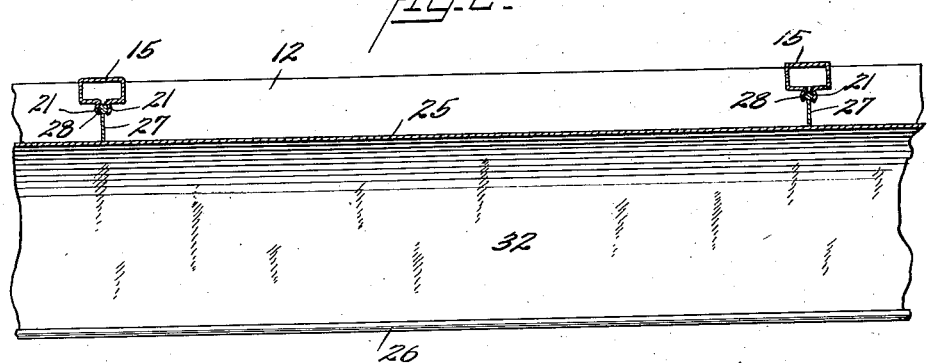
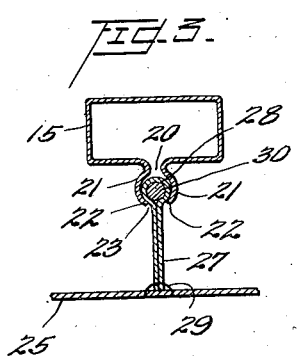
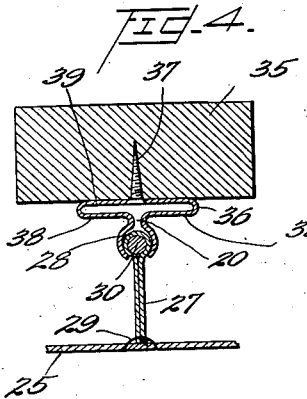
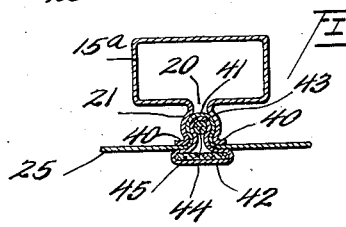

Patented May 26, 1936

2,042,431

UNITED STATES PATENT OFFICE 2,042,431

MOTOR VEHICLE

George H. Hooper, Detroit, Mich.

Application July 31, 1934, Serial No. 737,849

6 Claims. (Cl. 296—137)

This invention relates to motor vehicles and more particularly to the tops or roof constructions of such vehicles.

The general object of the invention is the provision of a roof or top structure for a motor vehicle or the like, in which are embodied novel and improved means for attaching the headlining to the roof framing. By the employment of these means the use of numerous fastening elements is obviated and much time and effort is saved during the installation and assembly of the headlining and framing. Furthermore, when assembled, the underside of the headlining presents an even surface unmarred by an unsightly sagging of the lining material.

In its illustrated embodiments, the invention contemplates either the provision of unitary ribs or cross members forming a part of the roof framing and embodying in themselves securing means for the headlining; or the provision of supplemental members for performing this attaching or securing function which are in turn adapted to be fastened to any type of rib or cross member which may be utilized in constructing the framing. The latter expedient will obviously be found useful in applying headlinings to any type of vehicle top, either in the nature of a replacement in the case of an old car or in the original assembly or manufacture of the vehicle.

Other objects and features of novelty will be apparent from the following specification when read in connection with the accompanying drawing in which certain embodiments of my invention are illustrated by way of example.

In the drawing:

Figure 1 is a transverse sectional view through a portion of the roof frame of a vehicle embodying the principles of my invention;

Figure 2 is a view in vertical central longitudinal section taken on line 2—2 of Figure 1;

Figure 3 is a cross sectional view on an enlarged scale through one of the cross members of the roof frame and showing in more detail the means for supporting the headlining;

Figure 4 is a view similar to Figure 3 illustrating a modified form of supporting means for use with other types of cross framing members; and Figure 5 is a view of the same nature as Figures 3 and 4 showing a further modification in which a separable strip is employed in securing the sheathing to the cross members.

The roof frame to which my invention is applied may be of any suitable or desired construction, and in the exemplary embodiment illustrated in Figure 1 of the drawing, this frame is designated generally by the numeral 10. The frame may comprise the longitudinal side rails 11 and the inwardly disposed longitudinal timbers 12 which are arranged in parallel relation with the side rails 11 and are secured thereto and braced by the ribs 14. These ribs 14, in the example shown, are curved to generally conform to the transverse profile of the roof and are adapted to support the metal sheathing or covering which is applied to the side and rear portions of the top of the motor vehicle. The longitudinal roof timbers 12 are connected at intervals along their length by the cross members 15 which in the first three figures of drawing comprise metal stampings of hollow box-like cross section. Each end of these cross members 15 is preferably cut away or suitably beveled as at 16 to provide the flat projecting ends 17 which are adapted to be secured to the members 12 by suitable fastenings as at 18.

In the illustrated embodiments, each of these members 15 is of substantially rectangular cross section and the lower side thereof is provided with an opening or slot 20, the walls 21 of which are bent so that they extend generally outwardly from the hollow box-like body portion of the member to form the clamping or retaining members. The free edges 22 of the extended walls of the slot 20 are, for this purpose, bent inwardly toward each other to form a narrow opening or mouth 23, whereby an interlocking means is provided for retaining certain elements now to be described. The slot 20 formed as suggested, is in effect and function a dovetail slot and will be so designated in certain of the claims.

A headlining 25 which comprises the inner covering or upholstery of the roof structure may be secured at its edges to the roof framing by any suitable means such as the molding strips 26 and is adapted to be secured at its intermediate portions to the cross members of the roof frame by the following means. Secured to the headlining 25, at intervals corresponding to the spaces between adjacent cross members 15, are the vertically disposed elongated strips 27. These strips 27 are formed of a suitable fabric preferably, though not necessarily, in the form of a double thickness of such fabric so as to provide a loop at its upper edge, and is sewed to the inner side of the headlining 25 as by means of the blind stitching 29. An enlargement 28 is formed at the upper edge of each supporting strip 27 by inserting an elongated member 30 such as a cord, rope or wire in the looped fabric. The enlargement or bead 28 at the upper edge of the supporting strip 27 is adapted to fit snugly within the wider part of the slot 20, while the remaining portion of the members 27 extends through the narrowed opening 23. By this means, as will be readily perceived, the strip 27 is supported evenly at all points along its length and thus sagging or bulging of the headlining is prevented.

In the illustrated embodiment, the side portions 32 of the headlining may be made to conform to the curvature of the ribs 14 by any suitable stiffening or fastening means (not shown). It will be readily understood that the invention is applicable to top constructions with flat undersurfaces, in which case the supporting strips 27 will be made to extend virtually the entire width of the headlining, thus eliminating the curved side portions 32.

In any embodiment of the invention, however, the manner of applying the headlining together with its supporting strips 27 is the same and is facilitated by the means provided, whether the headlining is being applied to an otherwise completed vehicle or is applied during the assembly of the top as a unitary element. The cutting away or beveling of the cross member 15 as at 16 provides open ends for the slot 20 and it is a simple matter, in the application of the headlining, to insert the ends of the beaded edge 28 of the supporting strips 27 in the ends of the slots 20 in the respective cross members, and slide the beads through the slots until the supporting strips and the headlining are in place.

In Figure 4, there is illustrated an embodiment in which the cross members 35 are of wood and to the undersides of which there are secured the headlining supporting members 36 as by means of the fastening elements 37. The body portions of the members 36 are considerably flatter than those of the corresponding members 15 and are formed by folding or creasing the side flanges 38 of the member over upon the base portion 39 and then bending them outwardly away from the plane of the base portion to form a slot 20 just as in the embodiment previously described. The slot 20, in this case, also provides means for the entry of a tool for the application of the fastening elements 37.

In Figure 5 of the drawing, there is illustrated a modified form of attaching means for application to either type of cross member, although it is illustrated in connection with a member having the same body configuration as that designated 15 in Figure 3. This cross member, indicated by the reference character 15a, is provided with an opening or slot 20 in its lower side, the walls 21 of the slot defining a widened portion and then converging near their lower edges to provide a restricted opening similar to that between the lowermost edges 22 in the example illustrated in Figure 3. The lower ends of the walls 21 in this case, however, are turned over or curled as at 40 so as to present a smooth edge for the application of the headlining 25.

The headlining in this embodiment is provided, at intervals corresponding to the spacing of the cross members, with folds 41 which are adapted to be disposed within the slots of the cross members and securely attached thereto by means of the interlocking attaching strips or elements designated generally by the numeral 42. It will be observed that these attaching strips 42 comprise a narrow elongated substantially tubular member 43 preferably made of the same fabric as the headlining. A cord member 44, similar to the corresponding elements 30 in the embodiments previously described, is disposed within the upper portion of the tubular fabric strip and performs a similar function in retaining the strip within the slot 20 of the cross member. The lower portion of the fabric member 43 extends below the underside of the headlining 25 and is adapted to be spread horizontally by means of the flat stiffening element 45 so that it covers the folded portion of the headlining at these points of support and provides a neat trim for the ceiling of the vehicle.

In applying the headlining to the roof frame in this embodiment of the invention, the supporting strips 42 with the folds of the headlining extending around the bead portion thereof, is fed endwise into the dovetail slots between the walls 21 thereof in a manner similar to that described in connection with the other embodiments. Preferably the beaded portion of the supporting strips 42 will fit loosely enough within the enlarged portion of the slot 20 to permit the headlining 25 to be pulled in a direction transversely to the cross member 15a for the purpose of tightening the headlining after application to the roof frame, but, of course, it must be of sufficient width to prevent downward removal between the narrowed lower portions of slot 20.

It is understood that the securing element may be considerably varied in practice, and that various other changes and modifications may be made in the embodiments illustrated and described herein without departing from the scope of the invention as defined in the following claims.

Having thus described the invention, what is claimed as new and desired to be secured by Letters Patent is:

1. In a vehicle top construction, in combination, a roof frame provided at spaced intervals with downwardly opening slots, the walls of which define a relatively wide portion and converge at their lower edges to form relatively narrow openings, a headlining provided with folds occupying said slots, narrow elongated, relatively flexible attaching elements each provided with a corded insert to form a beaded edge adapted to occupy one of said folds and to be received within the wide portion of the adjacent slot, a wider flat insert in the lower portion of said element adapted to be disposed horizontally and to provide a neat covering strip for concealing the folds of said headlining.

2. In a vehicle top construction, in combination, a roof frame provided at spaced intervals with downwardly opening slots, the walls of which define a relatively wide portion and converge at their lower edges to form relatively narrow openings, a headlining provided with folds occupying said slots, narrow, elongated, tubular, flexible elements each provided with a corded insert to form a beaded edge adapted to occupy one of said folds and to be received within the wider portion of the adjacent slot, a wider flat insert in the lower portion of said element adapted to be disposed horizontally and to provide a neat covering strip for concealing the folds of said headlining, said folds, together with the said elements, being insertable at the ends of said slots and movable therethrough to properly adjusted position, said securing elements fitting within said slots snugly enough to prevent downward removal of the folds of said headlining but loosely enough to permit slippage of said headlining when pulled taut in a direction transversely to said slots.

3. In a vehicle top construction, in combination, a cross member, a fabric headlining, an elongated supporting strip connected with said headlining, said cross member comprising an elongated body portion and longitudinally extending, outwardly projecting portions for the reception of said supporting strip, said last named portions comprising substantially parallel flanges forming a slot between them, said supporting strip being received within said slot between said flanges, said body portion being secured to the framework of the car body and said strip receiving portion terminating short of the end of said body portion whereby said supporting means may be introduced into the open end of said slot and slid lengthwise therein during application of the headlining to the top construction.

4. In a vehicle top construction, in combination, a roof frame provided at spaced intervals with downwardly opening slots, a headlining provided with folds occupying said slots, narrow elongated tubular flexible attaching elements each provided with an insert forming an enlargement adapted to occupy one of the folds in said headlining and to be received within a slot, a second insert in said tubular element adapted to provide an exterior enlargement for concealing the folds of said headlining.

5. In a vehicle top construction, in combination, a roof frame comprising a pair of laterally spaced, longitudinally extending, side members, and a series of longitudinally spaced cross members connecting said side members, each of said cross members comprising an elongated hollow box-like body portion substantially rectangular in cross-section, the lower wall of said body portion being slotted, the edges of the slots provided with spaced substantially parallel downwardly extending flanges, said flanges being outwardly oppositely bowed to form an enlarged space therebetween for the reception of headlining attaching means, said space having a restricted lower opening provided by the downward convergence of said bowed flanges and preventing withdrawal of said means, said lower wall and the side walls of said hollow-box-like body portion being cut away near the ends of said cross members whereby they terminate short of said side members, the projecting ends of the upper wall of said body portion overlying and being secured to said side members.

6. In a vehicle top construction, in combination, a roof frame, a fabric headlining, a series of parallel dove tailed slots spaced at intervals along the underside of said roof frame, said headlining provided with a looped fold adjacent each of said slots and received therein, an elongated flexible attaching member provided with enlarged edges and a narrower intermediate portion, one of said enlarged edges being inserted within the fold of said headlining and also received within said slot whereby withdrawal of said fold from said slot is prevented, the other of said enlargements being disposed exteriorly of said slot and covering the edges of the fold in said headlining, said last named enlargement being exteriorly formed of material similar to that of which said headlining is made.

GEORGE H. HOOPER.